IMPACT DEVICE

Filed Jan. 26, 1953 10 Sheets-Sheet 1

Inventors:-
Eugene C. Clarke
Henry A. Weyer
by their Attorneys
Howson & Howson

April 24, 1956 E. C. CLARKE ET AL 2,742,802

IMPACT DEVICE

Filed Jan. 26, 1953 10 Sheets-Sheet 2

Inventors:
Eugene C. Clarke
Henry A. Weyer
by their Attorneys
Howson & Howson

April 24, 1956 E. C. CLARKE ET AL 2,742,802

IMPACT DEVICE

Filed Jan. 26, 1953 10 Sheets-Sheet 3

Inventors:
Eugene C. Clarke
Henry A. Weyer
by their Attorneys
Howson & Howson

April 24, 1956 E. C. CLARKE ET AL 2,742,802

IMPACT DEVICE

Filed Jan. 26, 1953 10 Sheets-Sheet 4

Inventors:
Eugene C. Clarke
Henry A. Weyer
by their Attorneys
Howson & Howson

April 24, 1956 E. C. CLARKE ET AL 2,742,802

IMPACT DEVICE

Filed Jan. 26, 1953 10 Sheets-Sheet 5

Inventors:
Eugene C. Clarke
Henry A. Weyer
by their Attorneys
Howson & Howson

Inventors:
Eugene C. Clarke
Henry A. Weyer
by their Attorneys
Howson & Howson

IMPACT DEVICE

Inventors.
Eugene C. Clarke
Henry A. Weyer
by their Attorneys
Howson & Howson

IMPACT DEVICE

Inventors:
Eugene C. Clarke
Henry A. Weyer
by their Attorneys
Howson & Howson

April 24, 1956 E. C. CLARKE ET AL 2,742,802

IMPACT DEVICE

Filed Jan. 26, 1953 10 Sheets-Sheet 9

Inventors
Eugene C. Clarke
Henry A. Weyer
by their Attorneys
Howson & Howson

Inventors:
Eugene C. Clarke
Henry A. Weyer
by their Attorneys
Howson & Howson

United States Patent Office 2,742,802

Patented Apr. 24, 1956

2,742,802

IMPACT DEVICE

Eugene C. Clarke and Henry A. Weyer, Chambersburg, Pa., assignors to Chambersburg Engineering Company, Chambersburg, Pa., a corporation of Pennsylvania Continuation of abandoned application Serial No. 684,583, July 14, 1946. This application January 26, 1953, Serial No. 333,128

10 Claims. (Cl. 78—20)

This invention relates to forging apparatus and more particularly to a forging apparatus of the impact type and is a continuation of application Serial No. 684,583, filed July 14, 1946, now abandoned.

An important object of the invention is the provision of an apparatus of this character in which the force of impact is absorbed by the impact elements thereby eliminating the necessity for the heavy foundations and anvil structures ordinarily associated with such apparatus.

Another object of the invention is the provision of an apparatus of this character which is so arranged that the work feeding is materially facilitated.

More specifically, an object of this invention is to provide an impact apparatus in which a pair of opposed horizontally disposed rams are brought into impact engagement for the purpose of forging, coining, branding, compressing or welding material therebetween and in which the construction is such that the speed of operation of the rams and their point of impact may be very accurately regulated, thus enabling the apparatus to be conveniently utilized automatically in conjunction with timed feeding mechanisms in which, if desired, the fed material being forged may be delivered by gravity between the dies.

Another object of the invention is to provide an apparatus of this character which is extremely simple and may be very readily controlled in operation to vary the acceleration force acting on the rams and hence the impact velocity achieved.

A further object of the invention is to provide an apparatus of the stated character which is so constructed and arranged as to be capable of complete enclosure of the forging zone to thereby eliminate the possibility of the accidents incident to the use of forging apparatus of the ordinary character with its open forging chamber and overhanging parts, and also to provide an enclosure in which a completely controlled atmosphere may be maintained for efficient heating and working of metal articles.

These and other objects we attain by the construction illustrated in the accompanying drawings wherein for the purpose of illustration we have shown various adaptations of our invention and wherein.

Figures 1, 5, 6:
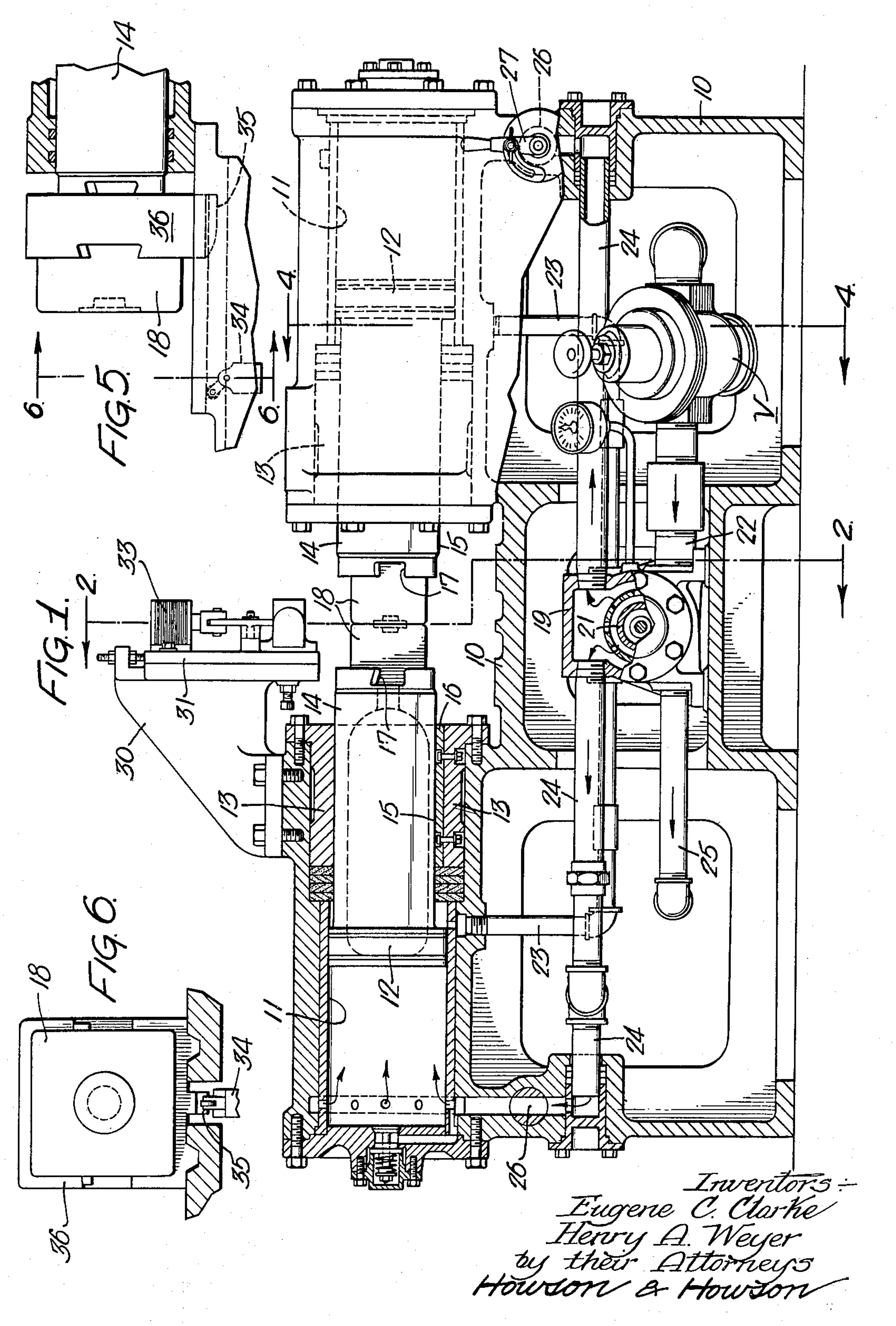
Fig. 1 is a view partially in section of a forging apparatus constructed in accordance with our invention.
Fig. 5 is a fragmentary side elevation partially in section illustrating a method of controlling over-running of the impact rams.
Fig. 6 is a section on line 6—6, Fig. 5.
Figure 2:
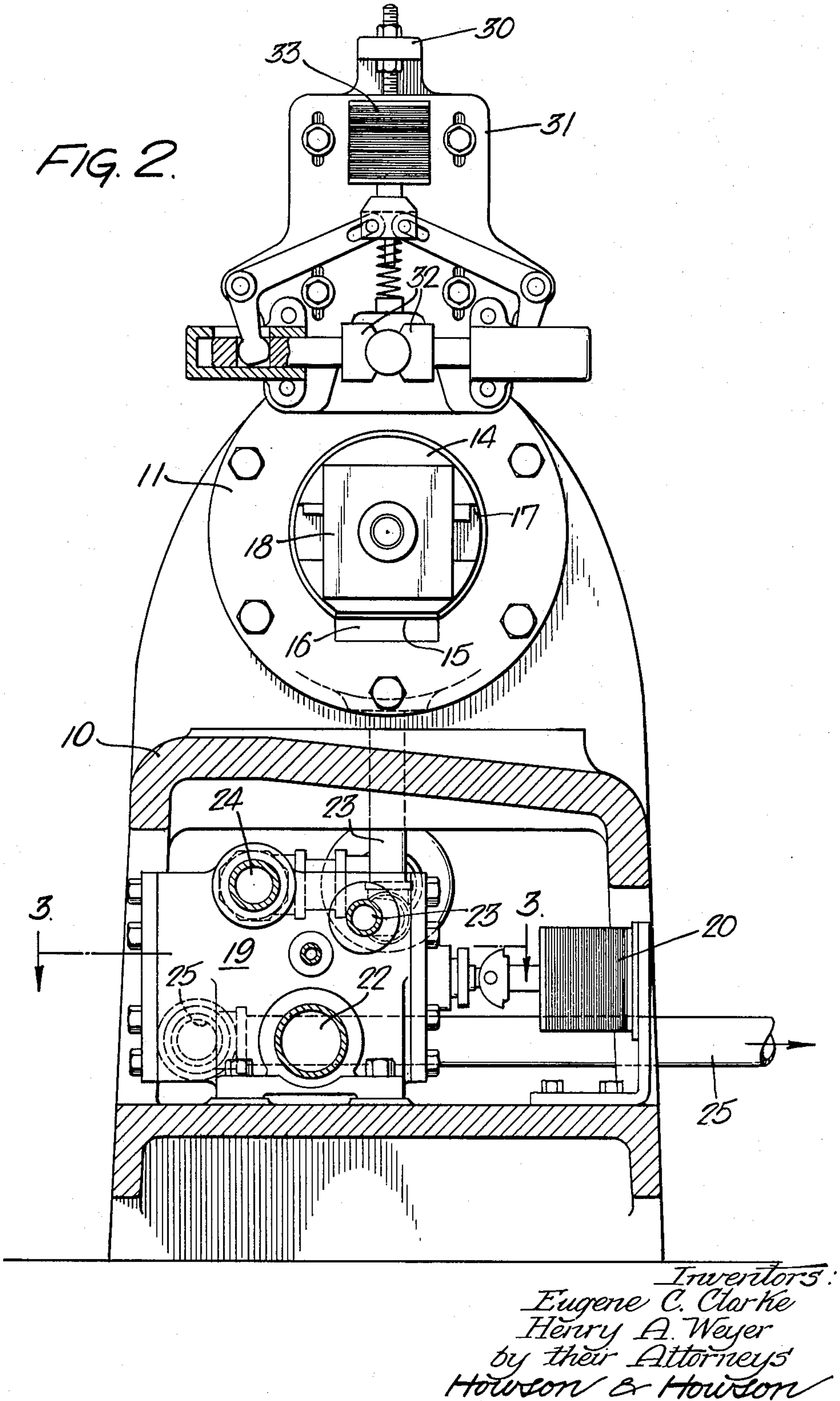
Fig. 2 is an enlarged sectional view on line 2—2, Fig. 1.

Referring now to the drawings and more particularly to Figs. 1 to 6 thereof, the numeral 10 designates a frame which mounts a pair of opposed horizontal cylinders 11 in which operate pistons 12. The adjacent opposed ends of the cylinders 11 each mount a combined gland and guide structure 13 within which operates a ram or die carrier 14 attached to the associated piston 12. The rams 14, more clearly shown in Fig. 2, are provided with flats 15 which prevent their rotation, and the correspondingly flatted portions of the glands 13 are provided with replaceable wear plates indicated at 16. The outer ends of the rams 14 are constructed as indicated at 17 for the reception of forging dies 18.

The cylinders 11 are supplied with fluid under pressure through a suitable control valve 19 to which fluid is supplied through inlet 22 at a pressure selectively regulated by means of a pressure regulator valve V. In the present instance the valve 19 is of the type having a piston 21 operated by a solenoid 20 to control the delivery of fluid pressure from the inlet 22 to the opposite ends of the cylinders 11 through delivery passages 24, and the exhaust fluid from the cylinders 11 is returned through lines 23 to valve 19 and the exhaust lines 25. Valves 26 are provided in the delivery passages 24 and these valves are equipped with suitable means 27 operable to permit them to be very accurately positioned.

Figure 3:
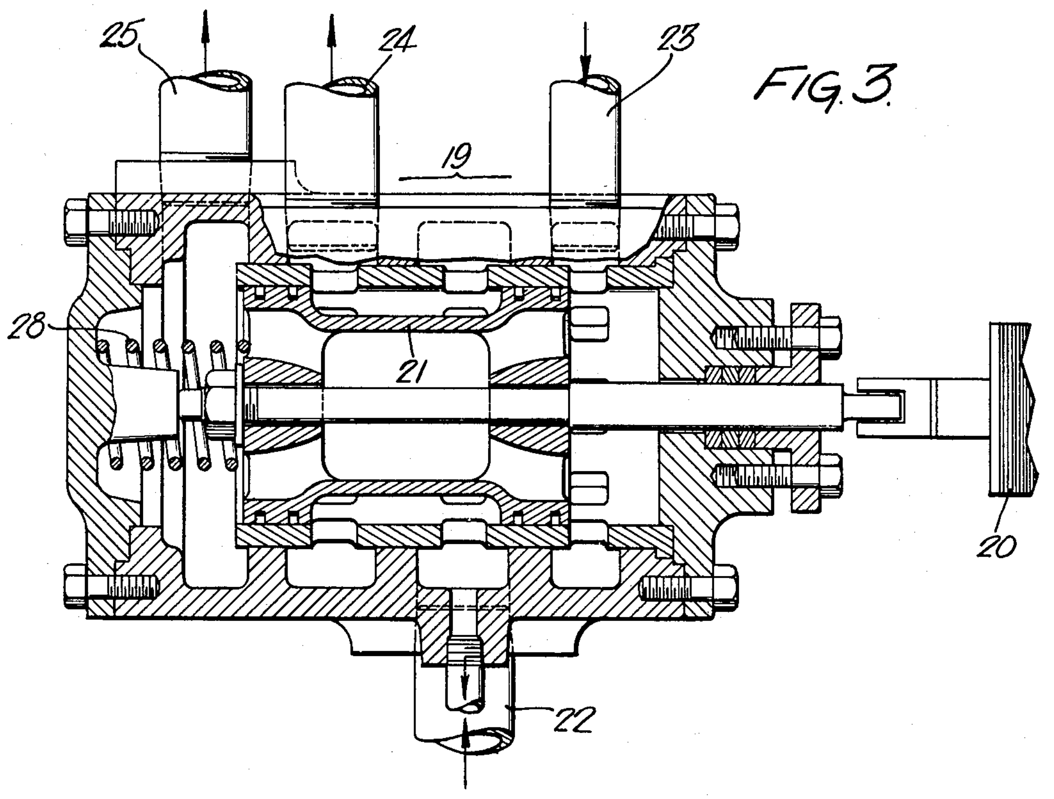
Fig. 3 is a detail sectional view through the control valve.

The valve 19 is of such character that the amount of fluid delivered to at least the outer ends of the cylinders is sufficient to provide instantaneous and rapid response of the pistons 12 and to impart to said pistons a speed such that the collision between the dies 18 mounted on the rams 14 will impart forging impact as differentiated from forging pressures. The valve 19 as shown in Fig. 3 is in its operative positions; that is to say, the position in which fluid pressure is delivered to the outer ends of the cylinders 11. From this position, it is returned by a spring 28 and with a valve of proper size, actuation of the solenoid 20 need only be momentary.

With reference to the pressure regulator valve V it is to be noted that adjustment of this valve serves effectively to control the energy delivered to the cylinders 11 to actuate the rams 14 and, since the rams operate in a horizontal plane and their acceleration and deceleration is not affected by gravity so that equal velocities of the two rams is achieved, it is pointed out that adjustment of the valve V can be employed at will to vary the accelerating force acting on the rams and consequently vary the impact velocities therebetween. This is an important characteristic of the present invention and functions advantageously not only in regulating the impact velocities accurately to the flow characteristic of the metal to be worked, but also as a part of the timed cycle when the device is used in conjunction with automatic feed devices and the like.

With a structure of this character, the dies 18 can be made to meet very exactly at an intermediate point despite the fact that machining limitations and differences in packing pressures will ordinarily result in meeting of these dies at one or the other side of a desired point. The valves 26 will permit close regulation of the amount of fluid pressure which may be delivered to the outer ends of cylinders 11 and thus afford compensation for many inequalities of operation as would result from the features above mentioned.

It follows that an apparatus of this character may be very readily supplied with material to be worked. Since the point of impact is exactly ascertainable, work guides 29 of the character suggested in Figs. 15 and 16 very readily may be utilized to support work which is to be submitted to simple forging operations. It furthermore becomes possible to feed work to the dies by simply releasing the work at a given level above the point of impact between the dies, in a given timed relation to the operation of the rams so that such work will be caught between the rams 14 as they come together.

A structure such as this is suggested in Figs. 1 and 2 in which one of the cylinders 11 mounts a bracket 30 upon which is vertically adjustable a slide 31 having clamps 32 to receive the material to be forged, these clamps being operated by a solenoid 33. The solenoid 33 obviously may be actuated in timed operation with the solenoid 20 controlling valve 19 or said solenoids may be operated simultaneously, and any inaccuracy in timing may be compensated for by vertical adjustment of slide 31. If the vertical adjustment of the slide 31 with respect to the point of impact is such that the work will arrive at the point of impact at the proper moment, the solenoids 20 and 33 may be operated simultaneously. It will also be observed that by employing an automatic timer in the circuit including the said solenoids, it will be possible to operate solenoid 20 first, followed by operation of solenoid 33, or to operate solenoid 33 first, followed by operation of solenoid 20. While the present illustration is that of a single time feed, it is obviously readily possible to so modify this construction that consecutive feeds may be made from a hopper.

Packing wear and other fluid losses may, at times, be the cause of misaligned impact between the dies 18, and means preferably are provided for interrupting operation of the mechanism in event either of the rams 14 overtravels its predetermined stroke. Such a means is illustrated in Figs. 5 and 6 and in the wiring diagram of Fig. 20, as comprising a limit switch 34 arranged in the path of a trip 35 on each of the impact rams 14 shown as mounted upon the die holder 36 of each of the rams 14, these switches being normally closed but being operated to open circuit position upon over-travel of either of their associated rams to interrupt the circuit containing the solenoids 20 and 33, thus rendering the driving mechanism temporarily inoperative to again actuate the rams. Any other suitable means may be employed to this end.

Figures 4, 20:
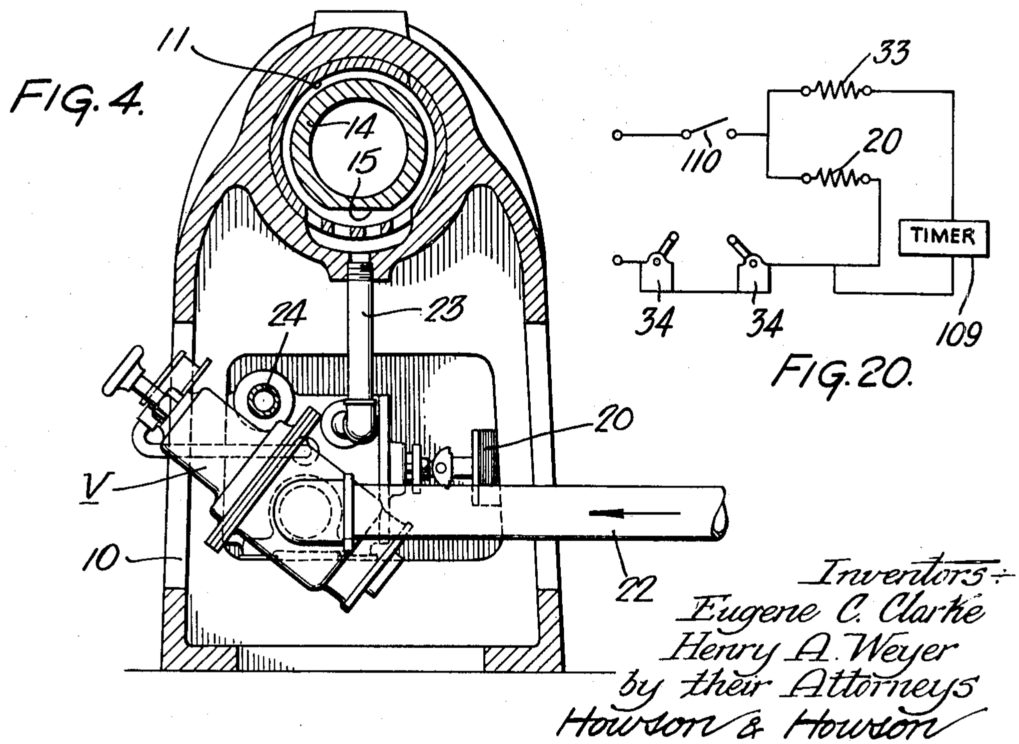
Fig. 4 is a section on line 4—4, Fig. 1.
Fig. 20 is an illustration of a wiring diagram and associated electrical mechanisms which may be employed for feeding the work in timed relation to operation of the rams and for controlling over-running of said rams.

In Fig. 20 of the accompanying drawings, we have shown by way of illustration, a relatively simple wiring diagram of an electrical circuit including solenoids 20 and 33, an adjustable timer 109, a circuit closing switch 110, and limit switches 34, 34. As above stated, limit switches 34, 34 are normally in their closed circuit positions. It will be obvious that when switch 110 is closed and switches 34, 34 occupy their normal closed positions, current will flow from the source to initially energize solenoid 20 to supply fluid under pressure through control valve 19 to cylinders 11 to simultaneously actuate the rams 14. This actuation of the rams is followed by energization of the solenoid 33, the time interval between actuation of solenoids 20 and 33 being determined by the setting of the adjustable timer 109, which adjustment insures the proper arrival of the work at the point of impact of the rams 14. There may be instances where it will be desirable to release the work by energization of the solenoid 33 in advance of energization of solenoid 20 in order to insure proper arrival of the work at the point of impact of the rams 14, in which event the positions of the solenoids 20 and 33 in the circuit shown in Fig. 20 would be reversed, so that the delayed action effected by adjustable timer 109 would cause initial operation of solenoid 33 followed by operation of solenoid 20. If the position of the slide 31 with respect to the point of impact between rams 14 is such that the work, when released, will properly arrive at the point of contact between the rams 14, the operation of solenoids 20 and 33 may be simultaneous and the inclusion of the adjustable timer 109 in the circuit is not necessary, i. e. the solenoids will operate simultaneously rather than sequentially. It will be readily apparent that when either of the rams 14 over-travels, its associated switch 34 will be actuated to open position whereupon the circuit will be opened and the impelling means will be rendered inoperative to again actuate the rams.

Figure 7:
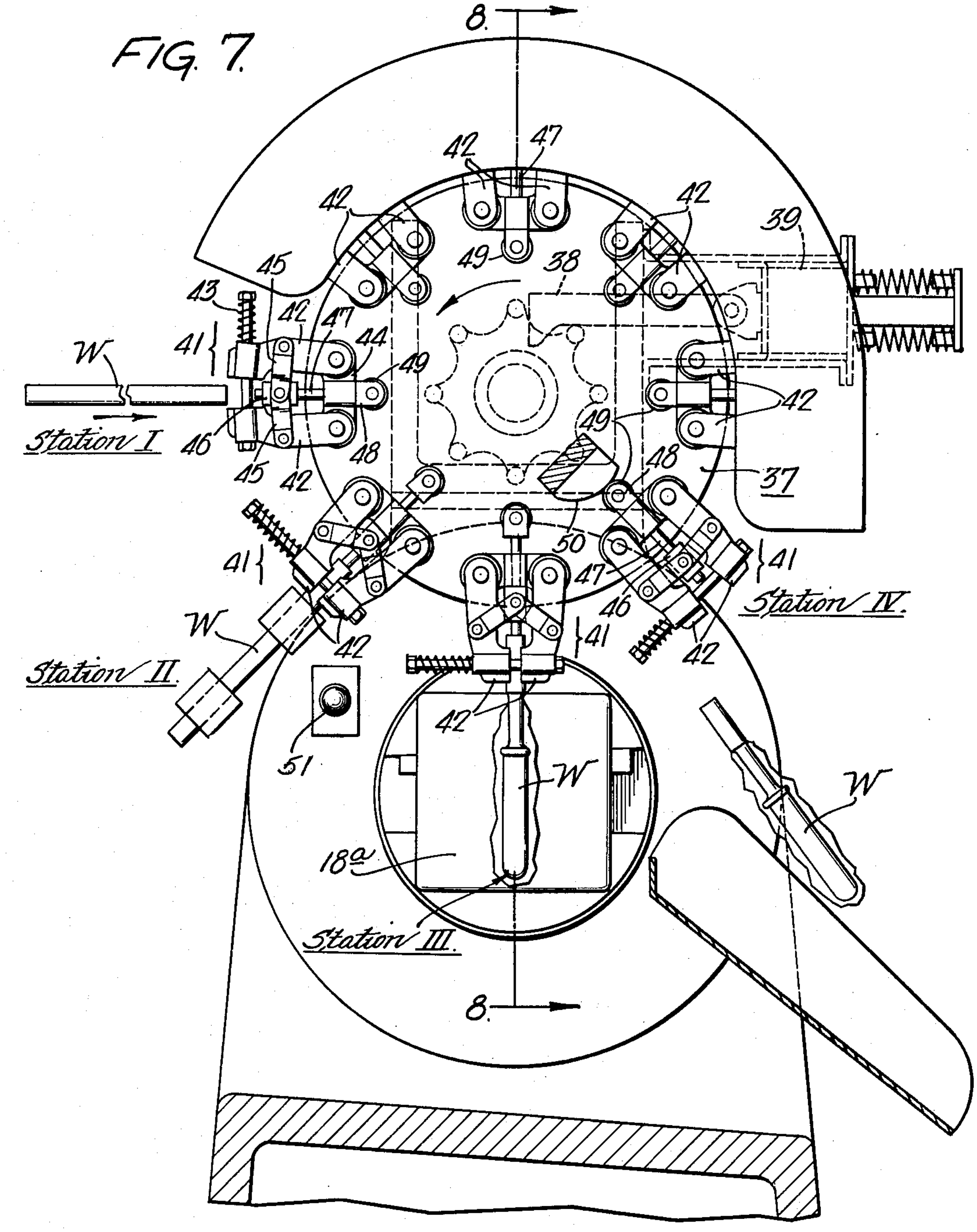
Fig. 7 is a partial transverse sectional view through the forging apparatus showing one type of work feeding mechanism usable therewith.
Figure 8:
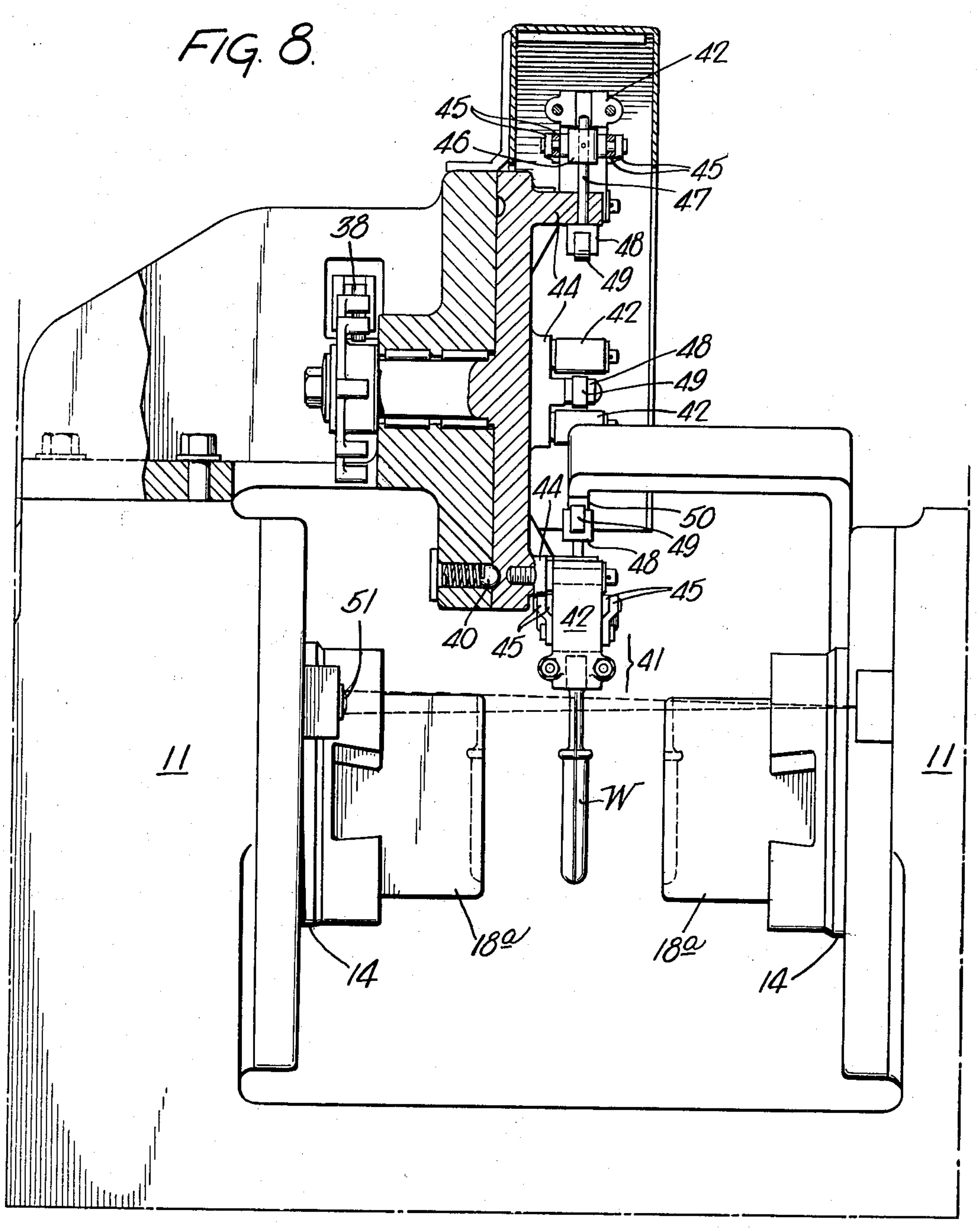
Fig. 8 is a vertical sectional view taken on line 8—8, Fig. 7.

Since the operation of the control valve need only be momentary, this operation may be very readily controlled by automatic work feeding mechanisms. One such mechanism is illustrated in Figs. 7 and 8 of the drawings in which the numeral 37 designates a rotatable work holder which is actuated through a plurality of stations by a latch 38 in turn operated by a solenoid 39. At each station the work holder 37 is held through a suitable positioning means generally designated at 40. The work holder includes toggle clamps 41 corresponding in number and arrangement to the positions of the work holder, each of these clamps comprising a pair of clamping arms 42 forced together by springs 43 to grip the work W. The arms 42 are pivoted to brackets 44 secured to the work holder and are connected adjacent their outer ends by toggle links 45 which are pivoted to blocks 46 secured to control rods 47. The inner ends of these control rods have heads 48 provided with tappet rollers 49 adapted for engagement with a stationary cam 50.

Pivotal movement of the links 45 in one direction is limited by engagement of the blocks 46 with the brackets 44 when no work-piece is held between the clamping arms 42, and when a work-piece is clamped between said arms 42 pivotal movement of the links 45 in said one direction is limited by engagement of the clamping arms 42 upon the work-piece. On the other hand, movement of the links 45 in the opposite direction is limited by engagement of the heads 48 with the inner faces of the brackets 44. It will be obvious that with such a construction, if the rods 47 are forced outwardly, the action of springs 43 will, after the pivotal connection between links 45 has passed a line connecting the pivots of these links to the arms 42, constantly urge the rods 47 outwardly since the spring action will tend to move the pivot outwardly. The clamp, therefore, once opened will remain open until the rod 47 is forced inwardly sufficiently to move this pivotal connection beyond alignment with the pivots of the links 45 to the arms 42 and thus may be operated by abutting the work there against as suggested to the left of Fig. 7. At this time the rod 47 will move rapidly inwardly under the spring influence, causing the arms 42 to grasp the work. This station for inserting work will hereinafter be referred to as station I.

The succeeding station II brings the work held in the arms 42 into engagement with a resistance heating element (not shown) so that the work is brought up to forging heat. Passing from this station II to the work-piece interrupts a beam of light to a photoelectric cell device 51 and moves on to station III where the work-piece is disposed in alignment with the dies 18*a* and positioned for forging contact thereby. In station IV the movement of the work holder 37 brings the heads 48, and more specifically the rollers 49 thereof, into engagement with the cam 50 thereby forcing the rods 47 outwardly and opening the arms 42 to permit release of the forged article.

Figure 9:
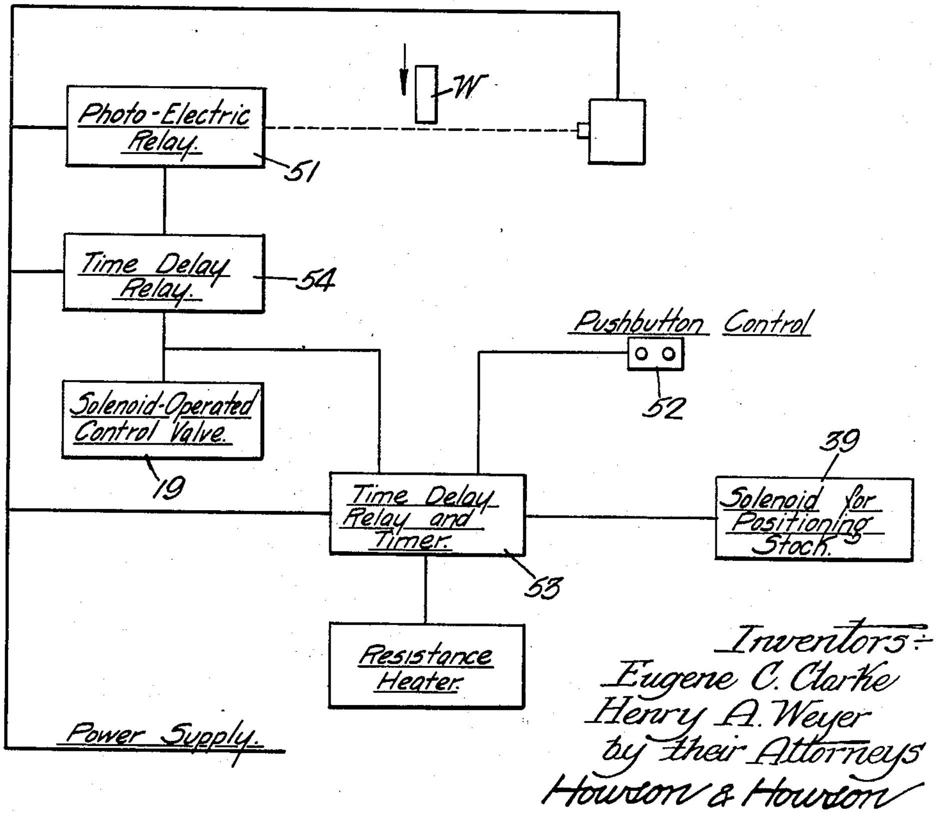
Fig. 9 is a control diagram for the mechanism illustrated in Figs. 7 and 8.
Figures 10, 11:
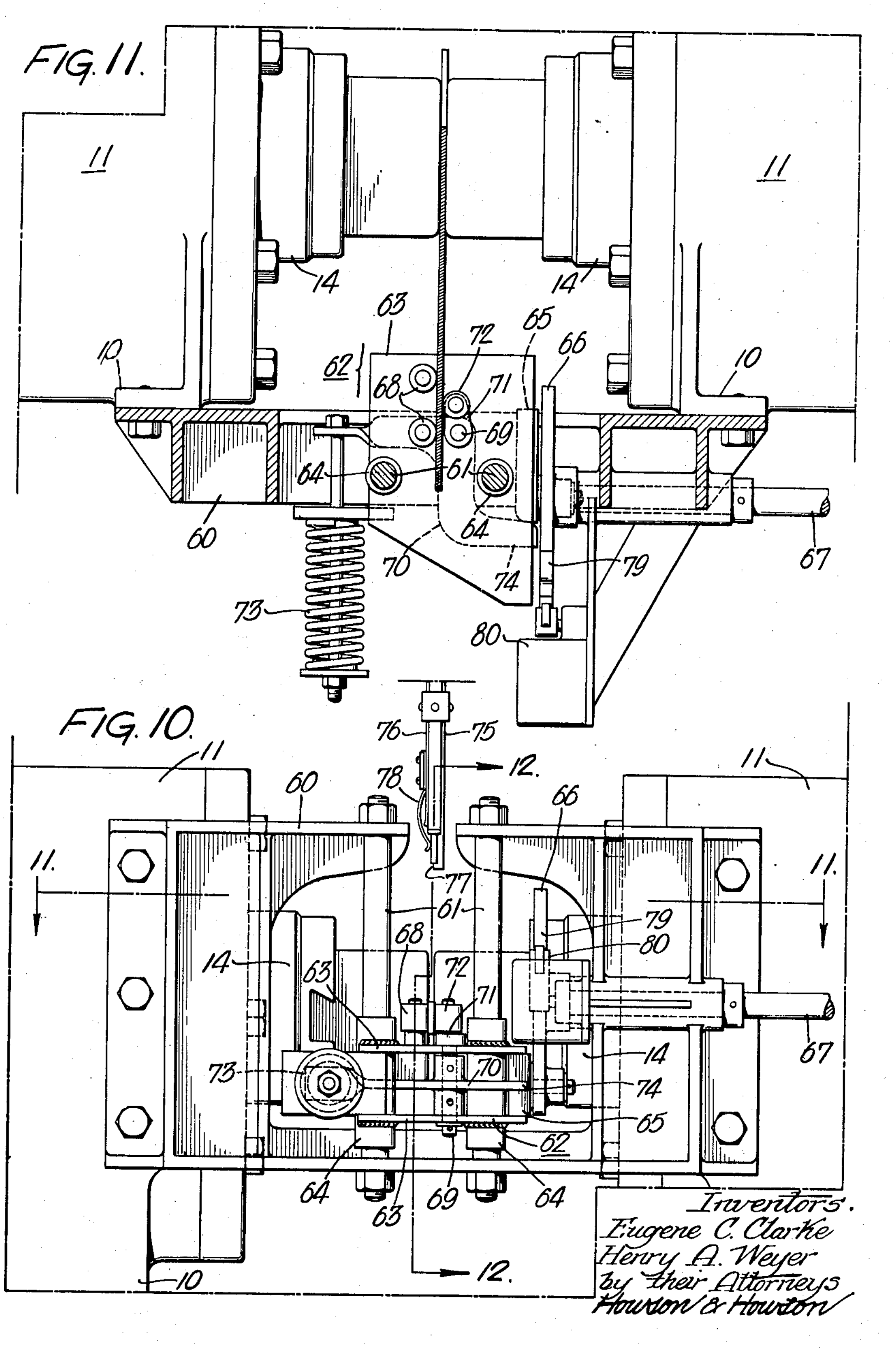
Fig. 10 is a side elevation of a mechanism for mechanically feeding articles between the dies.
Fig. 11 is a sectional plan view of the mechanism taken on line 11—11, Fig. 10.
Figure 12:
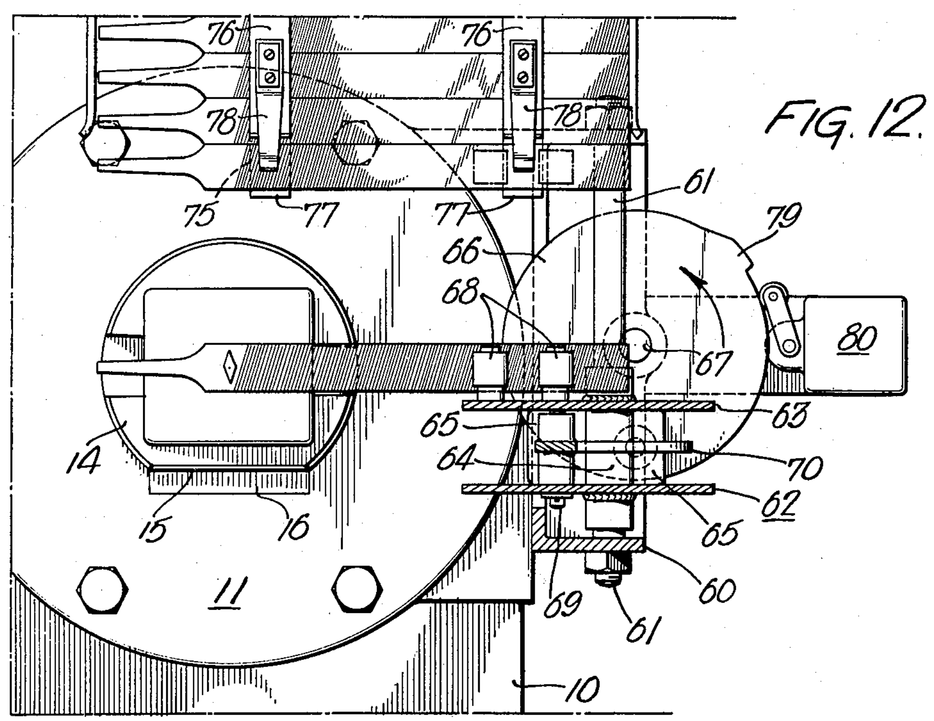
Fig. 12 is a fragmentary section on line 12—12, Fig. 10.
Figures 13, 14:
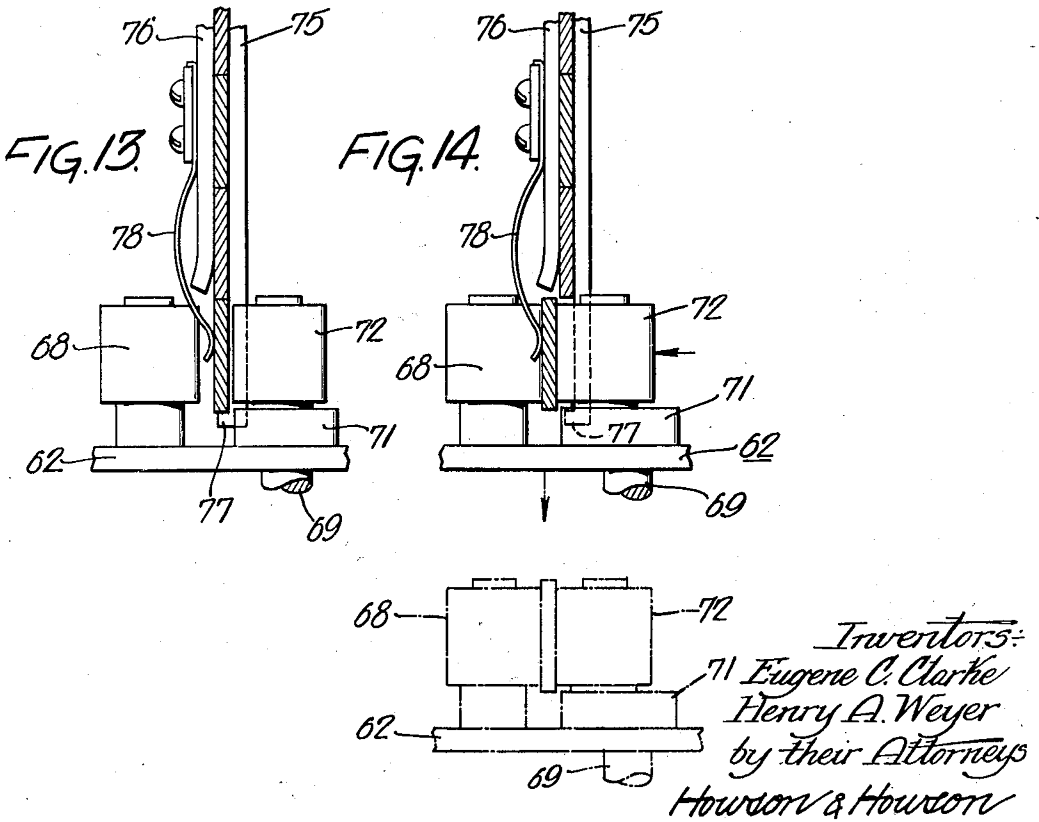
Figs. 13 and 14 are sectional views illustrating the manner of removing work from the guide mechanism of the feeding device shown in Figs. 10 to 12.

In Fig. 9 we have illustrated a line diagram of controls for the impacter with the feeding mechanism just described, the power circuits being illustrated by single heavy lines and the control wiring by light lines. Referring to this diagram and assuming that stock W has been manually placed in the machine at station I, operation is initiated by temporarily closing the starting button 52 thereby energizing solenoid 39 to cause the work to be advanced into position II and simultaneously closing the circuit of the resistance heating element (not shown) through the time-delay relay and timer 53. After a preselected time the relay and timer 53 will act to disconnect the resistance heater and again energize the positioning solenoid 39 to advance the work another step to station III. As the work W interrupts the light beam to the photoelectric cell 51, a momentary impulse trips the time-delay relay 54. After a short interval the solenoid 20 of valve 19 is energized, causing the impacter dies to strike the work which is now at station III. A portion of the current impulse from the photoelectric device 51 is utilized to trip the relay 54 controlling the heater element through the time-delay relay and timer 53, thus initiating a second cycle. The apparatus will continue to function until the circuit is interrupted in some manner or by failure of the machine to contain stock at the time of movement of a work holder by the photoelectric cell. It will be noted that the machine thus incorporates means to prevent any accidental engagement of the dies 18*a* when there is no work present.

In Figs. 10 to 14 we have illustrated a mechanism for mechanically feeding articles such as files or the like between dies for engagement thereby. In these figures the numeral 60 generally designates a frame which may be secured to the impacter frame 10 in any suitable manner, this frame 60 embodying vertical guides 61 upon which is vertically slidable the carriage 62. Vertical reciprocation of this carriage 62, which includes upper and lower plates 63 secured to one another by tubes 64 embracing the guides 61, is obtained by a cam bar 65 slidably engaged between these plates 63 and pivotally mounted upon a cam disc 66 driven by a constant speed shaft 67. The upper plate 63 mounts a pair of stationary clamping rollers 68, which are spaced from one another in a direction transverse to the impacter. Between the plates 63, and upon a pivot or pin 69, there is mounted a bell crank lever 70 and above the upper plate 63 on said pivot pin 69 there is mounted a movable arm 71 carrying a clamping roller 72 which is arranged in the same plane as clamping roller 68. This movable clamping roller 72 normally is positioned so that its face is in alignment with the adjacent faces of clamping rollers 68, being urged to this position by a spring 73 associated with one arm of the bell crank 70.

The other arm of the bell crank 70 has an extension 74, the terminal portion of which normally is disposed in close proximity to the face of cam disc 66. Shortly after the carriage 62 arrives at its lowermost position (an interval long enough to permit actuation of the impacter rams), the cam bar 65 comes into engagement with the extension 74 of the bell crank lever 70 and rotates the latter about its pivot 69 against the action of spring 73, thereby shifting the movable clamping roller 72 to the right and releasing the work which is disposed between the clamping roller 72 and the rollers 68. The engagement of cam bar 65 with extension 74 continues and maintains the movable roller 72 in its withdrawn position until carriage 62 has reached the upper limit of its travel.

Depending from a suitable hopper (not shown) are vertical guides 75 and 76, the guide 75 extending slightly below the guide 76 and having at its lower end a shoulder 77 against which a succeeding piece of work comes to rest following removal of each piece thereof, suitable light springs 78 being employed to hold the pieces of work in this position. When the carriage 62 reaches the upper limit of its travel, the clamping rollers 68 confront the work-piece in slightly spaced relation thereto and the roller 72 is arranged at the opposite side of the work piece from the rollers 68. At this time cam bar 65 disengages from extension 74, permitting the bell crank to move under influence of spring 73, thereby moving roller 72 to unseat the work from the shoulder 77 and clamp the work between stationary rollers 68 and the roller 72. The downward travel of the carriage 62 will, of course, at the lower limit thereof, be accompanied by a substantial dwell during which the carriage is substantially stationary, and at this time a trip cam 79 on the periphery of cam disc 66 momentarily trips a switch 80 to energize the solenoid 20 and actuate valve 19 and accordingly the impacter rams.

Figures 15, 16:
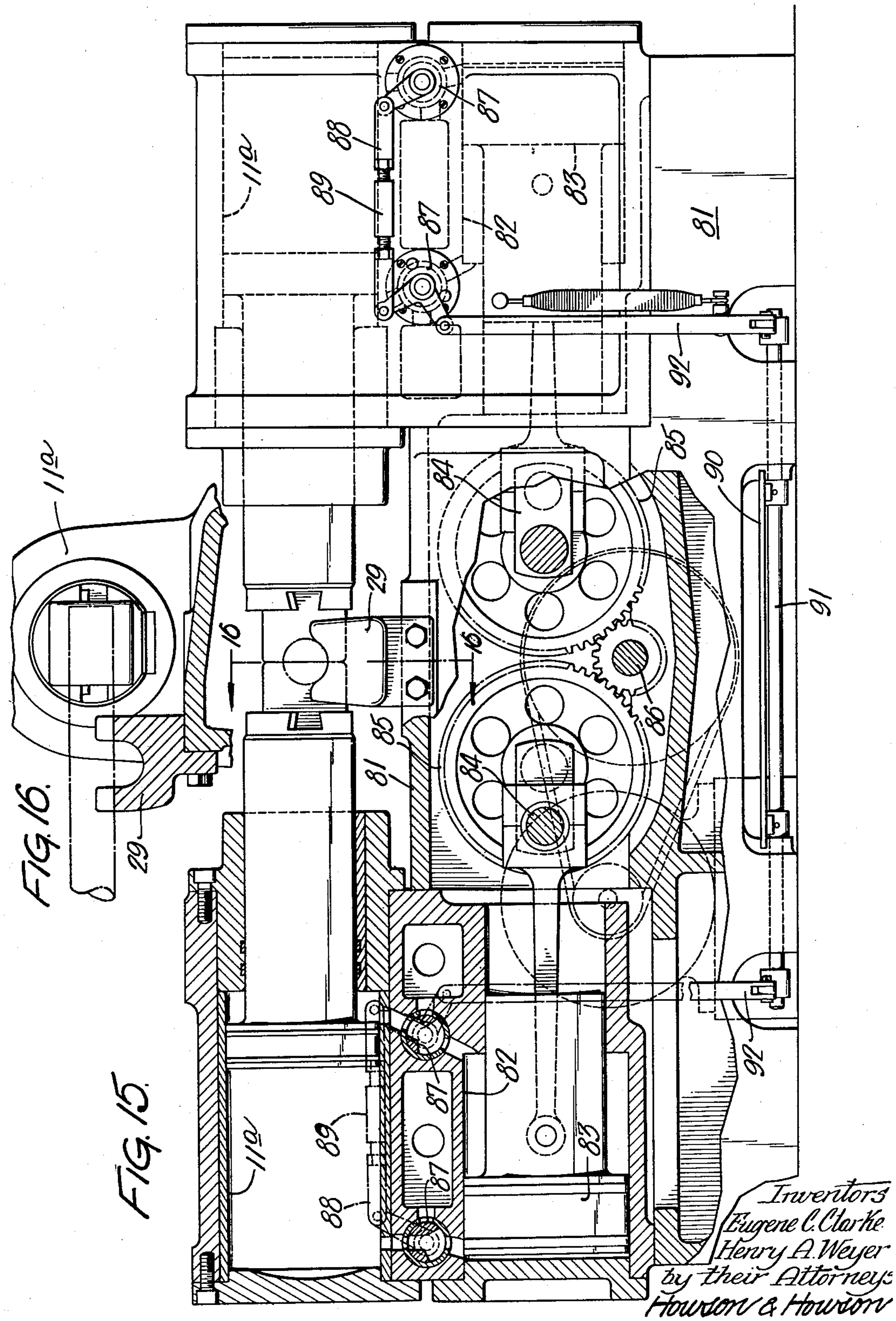
Fig. 15 is a side elevation partially in section showing a modified version of the forging apparatus.
Fig. 16 is a section on line 16—16, Fig. 15.

The structure so far described contemplates an apparatus which is operated by receiver pressure controlled through a single valve. This structure is obviously capable of considerable modification. In Fig. 15 we have illustrated a structure where the impacter mechanism and the pressure fluid source are incorporated in a single mechanism. In this structure the supporting base 81 of the machine provides compressor cylinders 82, the pistons 83 of which are driven by cranks 84 through gears 85 from a common drive 86. The ends of the compressor cylinders 82 are connected to the impacter cylinders 11*a* through valves 87, at present shown as connected to one another for simultaneous operation through links 88 containing an adjustment such as turnbuckle 89, which will permit adjustment of the position of the intake valves to the outer ends of the impacter cylinders to obtain the adjustment necessary to insure proper meeting of the dies upon the work. As likewise shown in this figure, the control of such a valve mechanism may comprise the usual treadle device 90 mounted on a rock shaft 91 connected to the valve mechanism by links 92, and in this connection it will be apparent that treadle 91 may be partially depressed to cause the valves 87 to correspondingly throttle the fluid pressure to the cylinders 11*a* and thereby vary the accelerating force acting on the rams and consequently the impact velocities therebetween.

An apparatus of this character, due to the high-speed impact and possibility of accurate alignment of the impact mechanism with the work lends itself admirably to use in the consolidation of granular substances such as, for example, the alloy materials employed in preparation of the heats in metallurgical furnaces. As ordinarily prepared, the granules are consolidated in substantially cylindrical blocks into which the granules have been compressed in an ordinary toggle press. Due to pressure limitations and lack of impact force in such a press, the cylinders are usually quite friable and when stored in any considerable quantity, tend to lose portions of their important content.

Figure 19:
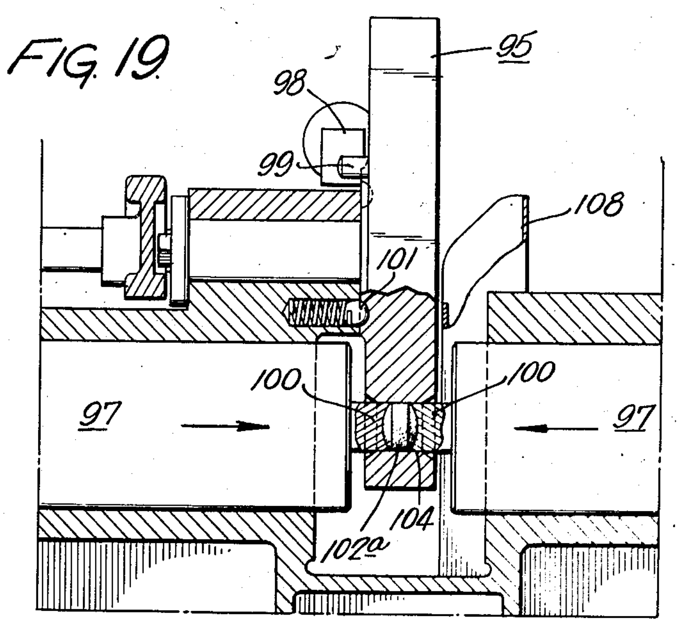
Fig. 19 is a fragmentary section on line 19—19 of Fig. 17.
Figures 17, 18:
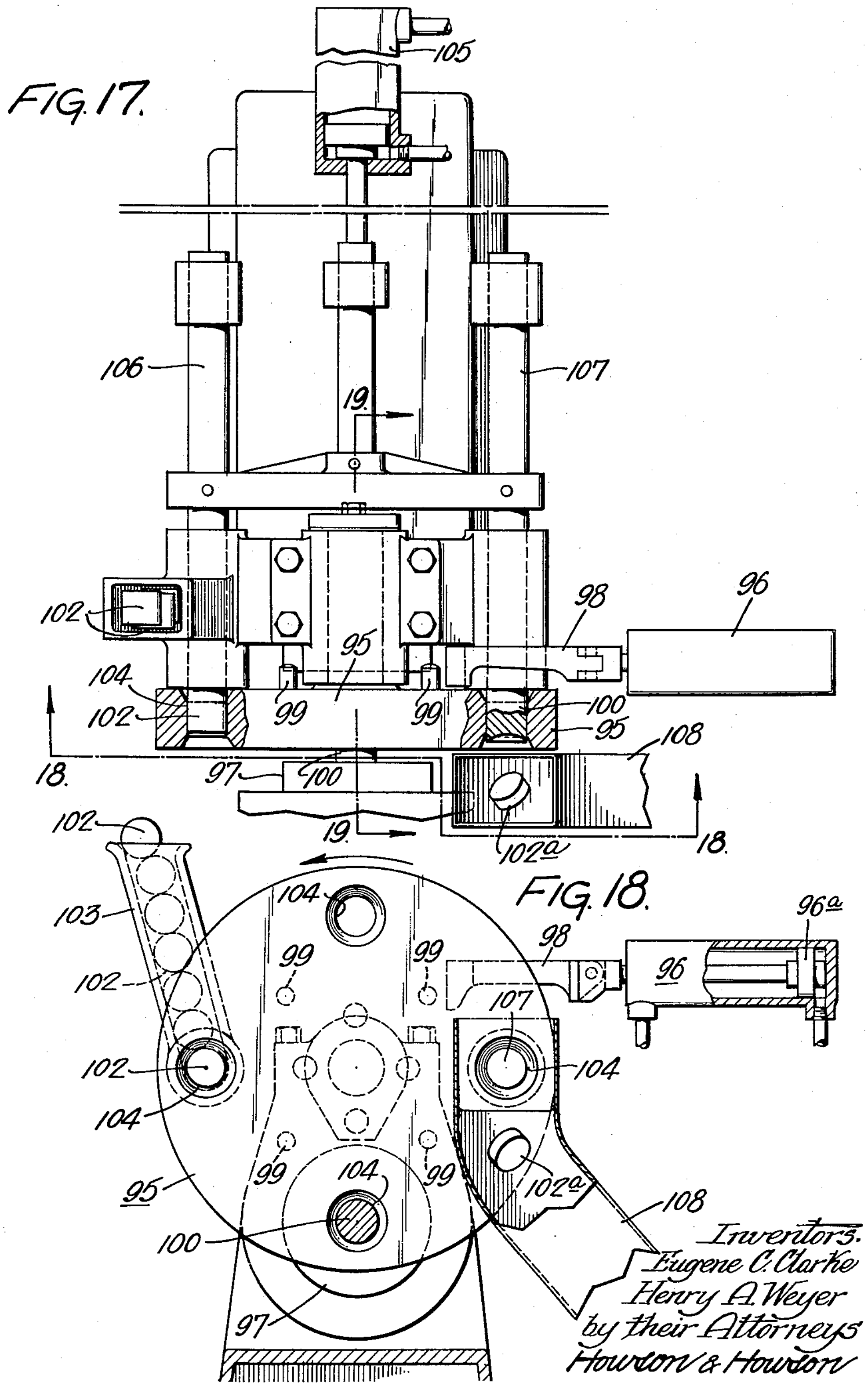
Fig. 17 is a partially diagrammatic plan view of another feeding mechanism.
Fig. 18 is a section on line 18—18, Fig. 17.

In accordance with the arrangement shown in Figs. 17, 18 and 19 of the drawings, we provide a rotatable holding plate 95 which is subjected to step-by-step rotation through the medium of a hydraulic cylinder 96, the piston 96*a* of which operates a push pawl 98 engaging a series of pins 99 secured to the plate 95. After each actuation of the pawl 98, the plate 95 is held in proper alignment with die elements 100 carried by the rams 97 through any suitable holding mechanism such as that suggested at 101. The cylindrical preforms 102 prepared as previously described are fed through a hopper 103 to a point in alignment with one of a series of openings 104 in plate 95. These openings 105 align with the hopper feed at a position, for example, 90°, in advance of alignment of the opening 104 with the impact dies 100 of rams 97.

At this position through a pusher cylinder 105 operating a pair of rams 106 and 107 between each step of rotation of plate 95, the ram 106 ejects a preform 102 from the hopper 103 and forces it into position in the aligned opening 104. Upon the succeeding step of rotation of the plate 95 the preform 102 supplied to the opening 104 is placed in alignment with the dies 100 of the impact rams 97 and through impact therebetween the preform 102 is consolidated to such an extent that it is no longer friable and may be readily stored in bins without loss of weight. The following step of rotation of plate 95 brings the compacted forms **102*a* into alignment with ram 107 by means of which it is ejected to a discharge chute 108**.

In describing this construction we have illustrated the plate as having four operative positions with a resultant operation of rams 106 and 107 for each step of rotation of the plate. It will, however, be obvious that the number of plate positions can be multiplied as desired in which event the operations will occur, not after consecutive steps of rotation of the plate but after a predetermined series of steps.

From the foregoing description it will be apparent that the present invention provides an impact apparatus which is constructed and arranged in such a manner that the source of impact is absorbed by the impact elements thereby eliminating the necessity for the heavy foundations and anvil structures ordinarily associated with such apparatus. The invention also provides an impact apparatus having a pair of opposed horizontally disposed rams which are brought into impact engagement for the purpose of forging, coining, branding, compressing and welding material therebetween wherein the construction is such that the speed of operation of the rams and their point of impact may be very accurately regulated thus enabling the apparatus to be conveniently utilized automatically in conjunction with timed feeding mechanisms in which, if desired, the fed material to be forged may be delivered by gravity between the dies.

The invention, furthermore, provides an impact apparatus which is extremely simple and may be very readily controlled in operation to vary the acceleration force acting on the rams and hence the impact velocity therebetween.

The invention also provides an apparatus of the stated character which is designed and constructed so that the working zone may be enclosed to eliminate the possibility of the accidents incident to the use of forging apparatus of the ordinary character with its open forging chamber and over-hanging parts, and also to provide an enclosure in which a completely controlled atmosphere may be maintained for the heating and working of metal articles.

Since the construction illustrated is obviously capable of considerable modification, we do not wish to be understood as limiting ourselves to the particular impact arrangements of the mechanism per se or to the particular feeding mechanisms illustrated except as hereinafter claimed.

We claim:

1. In an impact device, aligned horizontally opposed die supports mounting dies, electrically controlled fluid pressure actuated means to impel said die supports toward one another for high speed impact of the dies at a selected point upon work disposed therebetween and to immediately retract the same, means to regulate the force exerted by the impelling means on the individual die supports in moving said die supports toward one another to thereby insure accurate meeting of the dies at said selected point, electrically controlled means to position work at said selected point successively and in such timed relation to operation of said impelling means that the dies meet upon the work, and a common circuit for both of said electrically controlled means.

2. In an impact device, aligned horizontally opposed die supports mounting dies, electrically controlled fluid pressure actuated means to impel said die supports toward one another for high speed impact of the dies at a selected point upon work disposed therebetween and to immediately retract the same, means to regulate the force exerted by the impelling means on the individual die supports in moving said die supports toward one another to thereby insure accurate meeting of the dies at said selected point, electrically controlled means to position work at said selected point successively and in such timed relation to operation of said impelling means that the dies meet upon the work, electrically controlled means to render the impelling means inoperative when the dies meet at other than said selected point, and an electric circuit interconnecting all said electrically controlled means.

3. In an impact device, aligned horizontally opposed die supports mounting dies, fluid pressure actuated means to impel said die supports toward one another for high speed impact of the dies thereof with work disposed therebetween and to immediately retract the same, means to regulate the force exerted by the impelling means on the individual die supports in moving the die supports toward one another to thereby insure accurate meeting of the dies and work, means to support work in vertical alignment with and above the meeting point of dies on the work, and means to release said work for gravity fall and to actuate said impelling means in such timed relation that the dies meet upon the falling work.

4. In an impact device, aligned horizontally opposed die supports mounting dies, fluid pressure actuated means to impel said die supports toward one another for high speed impact of the dies thereof with work disposed therebetween and to immediately retract the same, means to regulate the force exerted by the impelling means on the individual die supports in moving the die supports toward one another to thereby insure accurate meeting of the dies and work, means to support work in vertical alignment with and above the meeting point of dies on the work, means to release said work for gravity fall and to actuate said impelling means in such timed relation that the dies meet upon the falling work, and means to render the impelling means inoperative when the dies meet at other than a selected point.

5. In an impact device, aligned horizontally opposed die supports mounting dies, fluid pressure actuated means to impel said die supports toward one another for high speed impact of the dies thereof with work disposed therebetween and to immediately retract the same, means to regulate the force exerted by the impelling means on the individual die supports in moving the die supports toward one another to thereby insure accurate meeting of the dies and work, vertically adjustable means to support work in vertical alignment with and above the meeting point of the dies on the work, and means to release said work for gravity fall and to actuate said impelling means in such timed relation that the dies meet upon the falling work.

6. In an impact device, aligned horizontally opposed die supports mounting dies, electrically controlled fluid pressure actuated means to impel said die supports toward one another for high speed impact of the dies thereof with work disposed therebetween and to immediately retract the same, means to regulate the force exerted by the impelling means on the individual die supports in moving the die supports toward one another to thereby insure accurate meeting of the dies and work, means to support work in vertical alignment with and above the meeting point of dies on the work, electrically controlled means to release said work for gravity fall, and a common circuit for both of said electrically controlled means.

7. An impact device comprising opposed aligned rams, drive mechanism to impel simultaneously the rams in opposite directions at high speed coaxially into forging impact with each other at a preselected point and then immediately retract the rams, and means operative by over-travel of each of the rams with respect to said preselected point for rendering said driving means temporarily inoperative to again actuate the rams.

8. An impact device comprising opposed aligned rams, drive mechanism to impel simultaneously the rams in opposite directions at high speed coaxially into forging impact with each other at a preselected point and then immediately retract the rams, said mechanism including control means common to both rams operable to apply balanced impelling force on said rams, means to regulate the impelling force of said drive mechanism upon the rams to thereby control the acceleration and impact velocity thereof, and means operative by over-travel of each of the rams with respect to said preselected point for rendering said driving means temporarily inoperative to again actuate the rams.

9. In an impact device, aligned horizontally opposed die supports mounting dies, fluid pressure actuated impelling means to impel said die supports toward one another for high speed impact of the dies at a selected point upon work disposed therebetween and to immediately retract the same, means to regulate the force exerted by the impelling means on the individual die supports in moving said die supports toward one another to thereby insure accurate meeting of the dies at said selected point, means to position work successively at said selected point, and control means for said impelling means and said work positioning means operable automatically to cause the latter to position work at said selected point in such timed relation to operation of said impelling means that the dies meet upon the work.

10. In an impact device, aligned horizontally opposed die supports mounting dies, fluid pressure actuated impelling means to impel said die supports toward one another for high speed impact of the dies at a selected point upon work disposed therebetween and to immediately retract the same, means to regulate the force exerted by the impelling means on the individual die supports in moving said die supports toward one another to thereby insure accurate meeting of the dies at said selected point, means to position work successively at said selected point, control means for said impelling means and said work positioning means operable automatically to cause the latter to position work at said selected point in such timed relation to operation of said impelling means that the dies meet upon the work, and means operative by over-travel of each of the die supports in respect to said preselected point to render said impelling means temporarily inoperative to again actuate the die supports.

References Cited in the file of this patent

UNITED STATES PATENTS

| | | |
|---|---|---|
| 1,459,592 | Latta | June 19, 1923 |
| 1,990,478 | Fitzgerald | Feb. 12, 1935 |
| 1,991,706 | Seabury | Feb. 19, 1935 |
| 2,014,206 | Oelkers | Sept. 10, 1935 |
| 2,027,915 | Kux | Jan. 14, 1936 |
| 2,302,115 | Gazey | Nov. 17, 1942 |